UNITED STATES PATENT OFFICE.

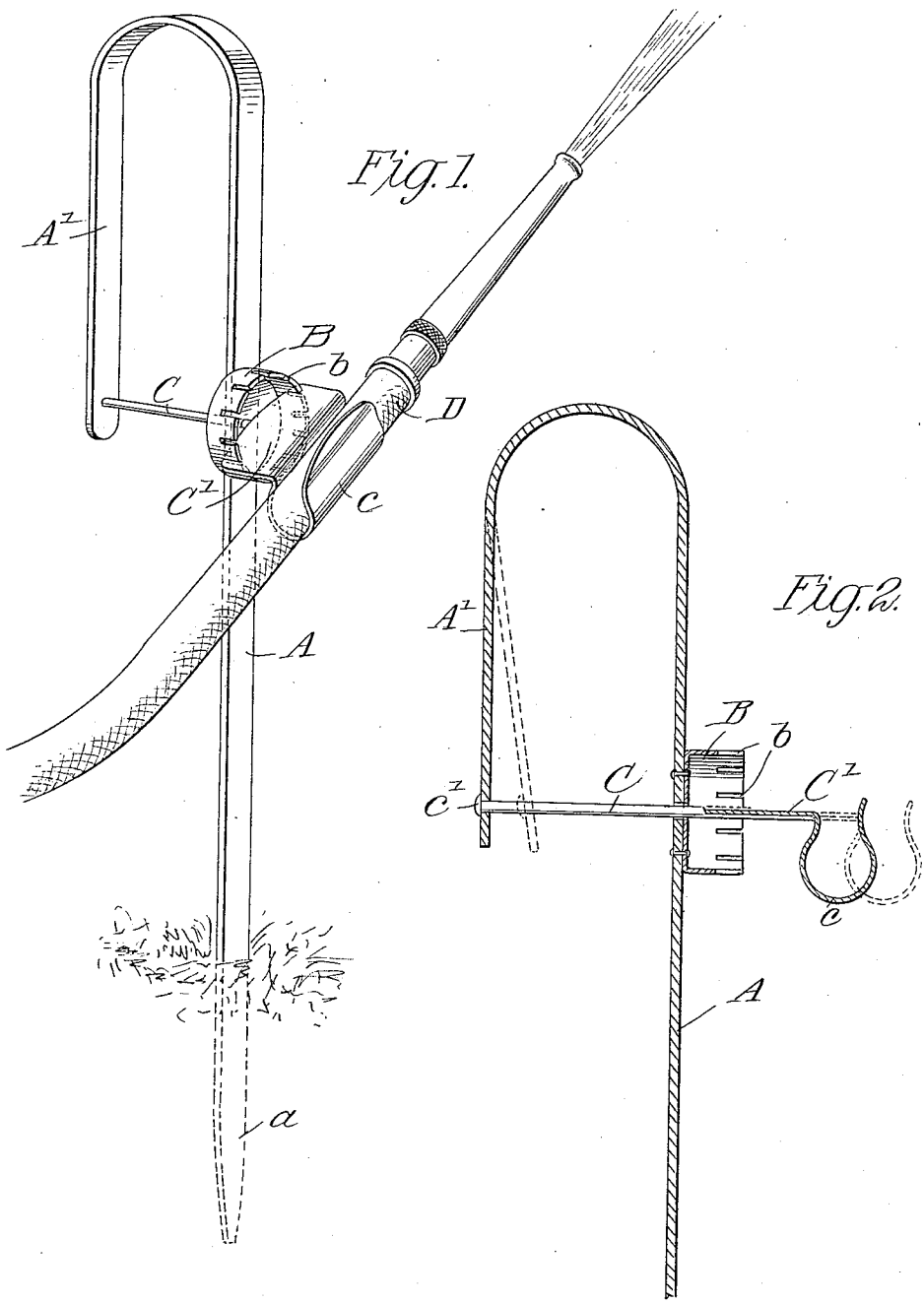

LAWRENCE PERCY BAILEY, OF MOUNTAIN VIEW, CALIFORNIA.

ADJUSTABLE HOSE-HOLDER.

1,065,202.  Specification of Letters Patent.  Patented June 17, 1913.

Application filed October 1, 1912. Serial No. 723,285.

*To all whom it may concern:*

Be it known that I, LAWRENCE P. BAILEY, a citizen of the United States, and a resident of Mountain View, in the county of Santa Clara and State of California, have invented a new and useful Improvement in Adjustable Hose-Holders, of which the following is a specification.

My present invention relates to hose holders, my object being to provide a simple, strong and inexpensive device by which the nozzle end of an ordinary hose may be conveniently and effectively held in various degrees of inclination.

The preferred embodiment of my invention is shown in the accompanying drawing, which forms a part of the specification, and in which—

Figure 1 is a perspective view illustrating the practical application of my invention; Fig. 2 is a central vertical section through my improvements as shown in Fig. 1.

Referring to these figures, my invention embodies a supporting stand comprising a staff A, the lower end $a$ of which is preferably sharpened in order that it may be conveniently embedded in the ground, as indicated in dotted lines in Fig. 1.

The staff A carries a circular guide flange B, this flange having a circular series of slots $b$ and constituting a permanent part of the staff, even though, as shown, it be formed separately and secured thereto.

Mounted to move longitudinally in a horizontal plane through the staff A is a rod C, forming the shank of a hose holding member, this shank being arranged at a substantially central point within the flange B and being provided at one end with a holding head B', the side portions of which are adapted for engagement within selected ones of the series of slots $b$ of the guide, inasmuch as the shank C is also rotatable with the head, and whereby the head may be thus held in various degrees of angularity as desired.

The head C' of the holding member has its outer portion bent to form an integral clip $c$, the function of which is to support the nozzle end of a hose D substantially in the manner indicated in Fig. 1, whereby the latter may be held in inclined position in accordance with the position of the head C'.

The upper end of the staff A is provided with a downwardly bent free arm A', through the free lower end of which the headed opposite end $c'$ of the shank C is extended, this shank being of such a length that in the normal position of the parts, as indicated in full lines in Fig. 2, the side portions of the head C' are held in engaged position within certain of the slots $b$. When, however, it is desired to disengage these parts for the purpose of adjusting the inclination of the head C', the lower portion of the staff arm A' is pressed toward the staff, as indicated in dotted lines in Fig. 2, thus causing longitudinal movement of the hose holding member for the purpose of moving the head C' away from the guide flange B. The head C' may be then rotated to the desired degree of inclination and upon its release the staff arm A' in returning to its normal position will draw the holding member into reëngagement with the guide flange.

It will be noted that the parts are extremely inexpensive and ready and simple of adjustment, and by reason of their weight may be readily transported from place to place as desired.

I claim:—

1. An adjustable hose holder comprising a single upright forming a supporting stand, and a pair of relatively engageable members, one of which is stationary, and the other of which is adjustable, and one of which members is carried by the supporting stand, the said upright having a downturned upper end forming a spring arm and connected to the other member whereby to hold the said members in engagement, one of the said members being also provided with the hose engaging clip.

2. An adjustable hose holder comprising a supporting staff having its upper end bent to form a spaced downwardly extending arm, a circular guide flange secured on the staff and provided with a series of slots, a hose holding member comprising a shank slidably and rotatably mounted through the staff centrally of the said guide flange, a substantially flat head at one end of the shank, provided with a hose engaging clip and having its flat portion adapted for engagement within selected slots of the guide flange, the opposite end of said shank being headed and extended through the lower free end of the said staff arm, for the purpose described.

LAWRENCE PERCY BAILEY.

Witnesses:
PHIL W. CLARK,
FRED R. MILNER.

Copies of this patent may be obtained for five cents each, by addressing the "Commissioner of Patents, Washington, D. C."